UNITED STATES PATENT OFFICE.

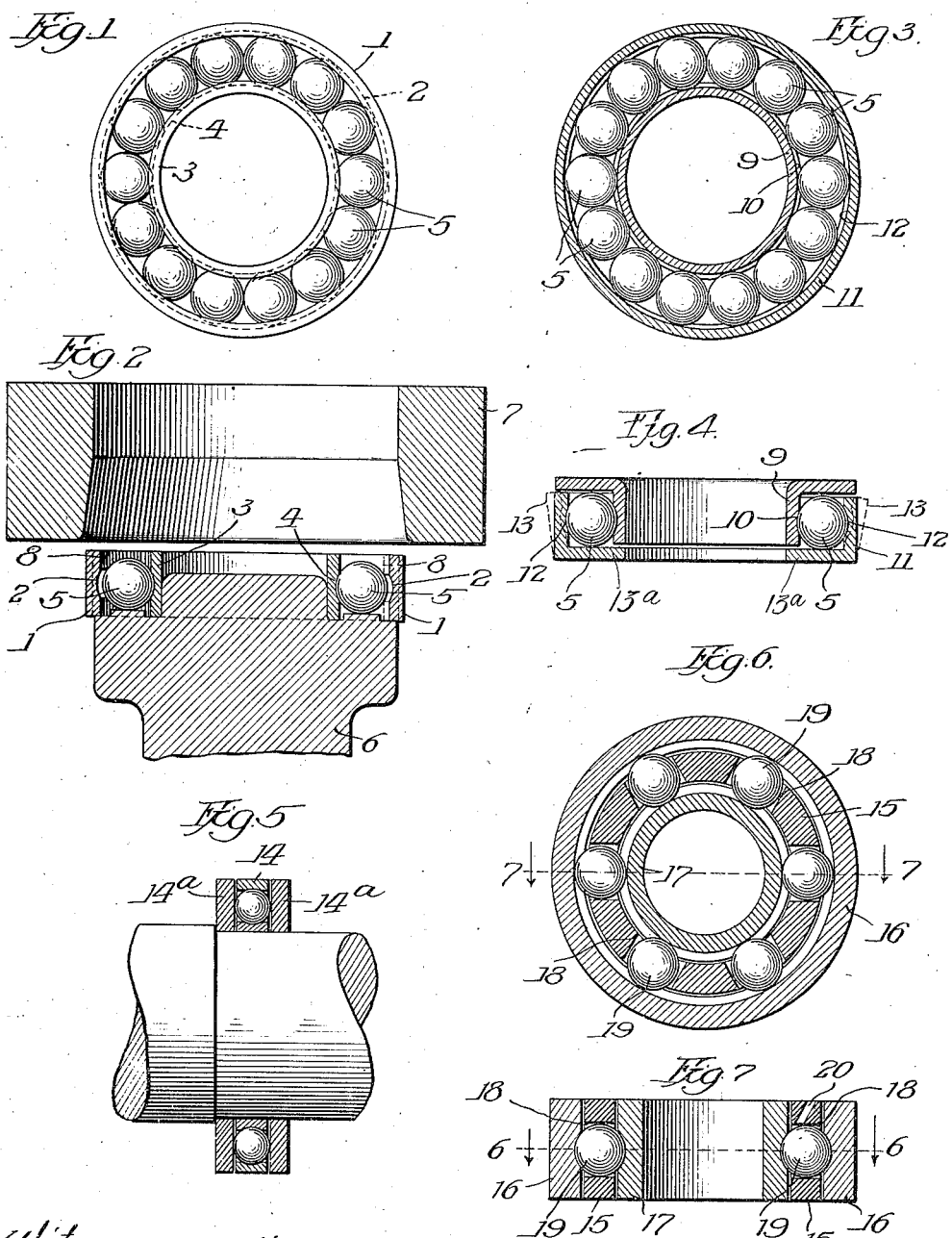

ALBERT S. REED, OF CHICAGO, ILLINOIS.

BALL-BEARING CONSTRUCTION.

1,080,169.   Specification of Letters Patent.   Patented Dec. 2, 1913.

Application filed April 8, 1912. Serial No. 689,100.

*To all whom it may concern:*

Be it known that I, ALBERT S. REED, citizen of the United States, residing at Chicago, in the county of Cook and State of Illinois, have invented a certain new and useful Improvement in Ball-Bearing Construction, of which the following is a full, clear, concise, and exact description.

In ball-bearing construction the inner and outer rings or races are provided with grooves and different methods have been employed for inserting the balls and preventing them from falling out. It is desirable that the ways should be practically filled so that there may be as many bearing points as possible to sustain the load and endure the wear.

So far as I am aware a construction, such as I am about to describe whereby the ways are practically filled with the balls, and the balls permanently secured against falling out, has not been heretofore devised.

The principal feature of my present invention consists in the method of compressing the outer race, cup or ring or expanding the inner ring so that the bearing-balls, after being placed in the race-way to practically fill the same, will be permanently prevented from falling out or becoming displaced.

My invention further consists in constructing the outer ring or race of the bearing of sufficient size to permit the insertion of the balls between the outer and inner bearing rings in the race-ways and, after the balls have been inserted, compressing the outer ring or expanding the inner ring and thereby contracting the annular space to correspond with the diameter of the balls so that the balls, while practically filling the race-way, will be held permanently from displacement.

My invention further consists in the combination with the balls of the inner and outer races, each provided with a groove, and the balls practically filling the space as will be described.

My invention will be more readily understood by reference to the accompanying drawings, in which—

Figure 1 is a plan view showing the balls in place between the grooves which are provided in the outer and inner rings or races; Fig. 2 is a view showing the bearing assembled and in position to be placed on a plunger just below a die through which the bearing is forced to compress the outer ring to bring the same to the position shown in Fig. 1; Fig. 3 illustrates another form of bearing, the outer race or ring being cup-shaped and the inner provided with a flange after the manner employed for vehicles; Fig. 4 shows the rim of the cup as indicated by dotted lines of sufficient size to permit the full complement of balls to be inserted, the full lines showing the cup as it appears after being compressed; Fig. 5 illustrates my invention as applied to an end-thrust bearing; Fig. 6 is a sectional view on line 6—6 of Fig. 7 illustrating a modification in which my invention is applied to a noiseless bearing; and Fig. 7 is a view of the same taken on line 7—7 of Fig. 6.

Like parts are indicated by similar figures of reference in the different views.

In Fig. 1 I have shown the outer ring or race 1 provided with the inner groove 2. The corresponding inner ring 3 is provided with an outer groove 4. The bearing-balls 5 are placed as shown between these rings. They are fitted to the grooves and practically fill the annular space.

The punch 6 shown in Fig. 2 is adapted to be forced upward to carry the bearing through the die 7 and thereby compress the outer ring to bring the parts to the position shown in Fig. 1. It will be noted that in Fig. 2 the ring 1 is large enough to permit the insertion of a sufficient number of balls, to practically fill the space. After the plunger has forced the bearing through the die the outer ring is contracted to the amount indicated by dotted lines 8 in Fig. 2 to cause the grooves 2 and 4 to conform to the balls.

In Figs. 3 and 4 the inner bearing ring 9 is provided with a groove 10 and the outer bearing ring or cup 11 is provided with a groove 12. It will be seen that in the sectional view Fig. 4 the dotted lines 13 indicate the size of the cup before being compressed. This compressible flange indicated at 13 is formed as shown in order that it may not be necessary in the process of compression to compress the inwardly extending flange 13ª.

Fig. 5 shows my invention applied as an end-thrust bearing. The outer-race 14 corresponds with the outer-race 1 of Fig. 1 and this is shown as having been compressed. It will be seen that the hardened washers 14ª take the thrust.

In Figs. 6 and 7 I have shown the annulus 15, which may be of fiber or any suitable material, interposed between the outer ring or race 16 and the inner ring or race 17. These rings 16 and 17 are provided as shown with grooves for the balls. In this instance the annulus 15 is provided with six openings 18 in which are inserted the balls 19. The annulus with the balls thus placed in position is inserted between the rings 16 and 17, after which the outer ring is compressed by means of a punch and die or other suitable tool to cause the balls to fit, as shown, between the corresponding grooves while the annulus, with the balls thus in place, fills the space all as shown. Oil ducts 20 are provided for the purpose of lubricating the bearings.

I have found it preferable to compress the outer ring rather than to expand the inner ring. My invention, however, broadly stated is not confined to either method since the essential feature of the method consists in constructing the rings of such a difference in size or diameter as to permit the insertion of enough balls to practically fill the circular space, and afterward to restrict the said space by giving the rings either one or the other or both a permanent set, that is a compression or expansion or both toward one another so that the balls will be held permanently in position between the grooves provided in the said bearing rings.

I have thus shown my invention applied to several forms of ball bearing structures. There are other modifications which would readily suggest themselves to those skilled in the art.

I claim:—

1. The method of assembling ball-bearings, which consists in constructing the outer race of enough greater diameter than the inner race to permit of practically filling the race-way with bearing balls; placing the balls in the race-way thus formed and then subjecting the outer race to great pressure to permanently diminish the diameter thereof to restrict the race-way to the size of the balls; whereby balls in sufficient number may be inserted to practically fill the race-way and be permanently retained therein, substantially as and for the purpose specified.

2. The method of assembling ball-bearings, which consists in constructing the outer and inner races or rings with corresponding grooves to form between the said races a race-way initially wide enough to permit the insertion of a sufficient number of balls to practically fill the said race-way throughout its circumference, and, after the balls are inserted, reducing by pressure the width of the race-way to cause the balls to fit between the grooves and to be held permanently from falling out or displacement.

In witness whereof, I hereunto subscribe my name this 5th day of April, A. D., 1912.

ALBERT S. REED.

Witnesses:
  ALFRED H. MOORE,
  MCCLELLAND YOUNG.

---

Copies of this patent may be obtained for five cents each, by addressing the "Commissioner of Patents, Washington, D. C."